May 1, 1928.                                                              1,667,905
J. SLEPIAN
ELECTRICAL MEASURING INSTRUMENT
Filed Dec. 15, 1924
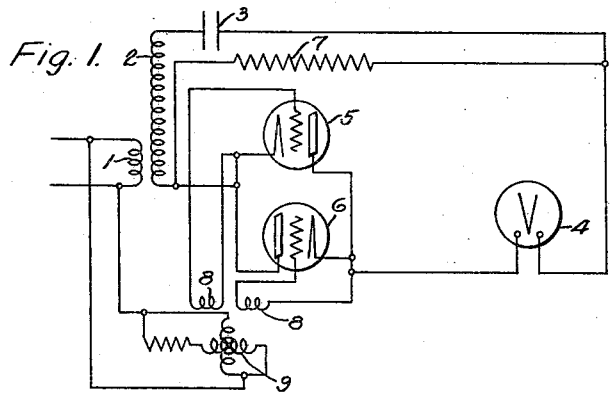
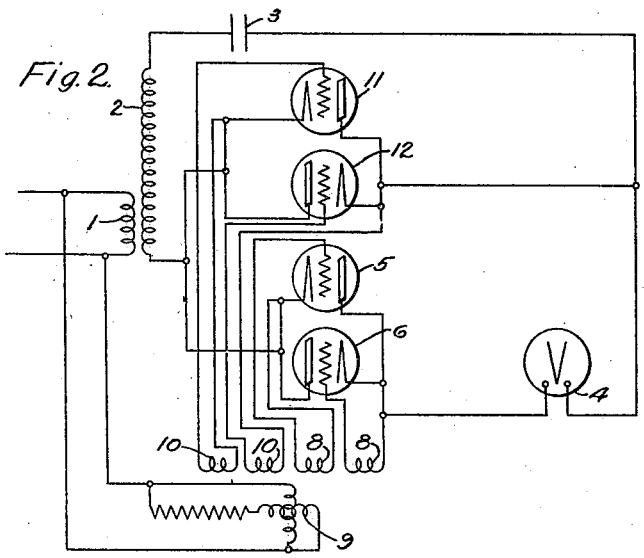
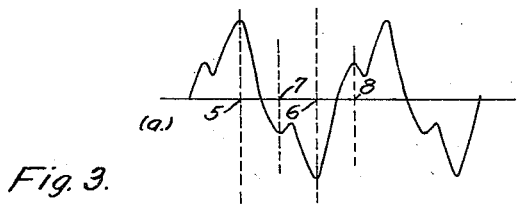
Fig. 3.
WITNESSES:
INVENTOR
Joseph Slepian.
BY
ATTORNEY Patented May 1, 1928.

1,667,905

UNITED STATES PATENT OFFICE.

JOSEPH SLEPIAN, OF SWISSVALE, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed December 15, 1924. Serial No. 755,819.

My invention relates to electrical measuring instruments and particularly to crest-measuring voltmeters.

The object of my invention is to provide an instrument for measuring the maximum value of an alternating voltage regardless of the wave form or frequency.

Heretofore, the maximum value of an alternating voltage has been measured by impressing the voltage to be measured across a condenser and observing the average condenser charging current which is proportional to the maximum value of the voltage.

To obtain the average charging current, both commutators and rectifiers have been employed. The use of the former is objectionable in that it requires troublesome brush adjustments and meets with rotational troubles at relatively high frequencies. The use of the latter is objectionable since it fails in measuring voltages having more than one maximum value per half cycle.

In practicing my invention, I provide a condenser that is connected across the source of voltage to be measured which condenser is connected in series with a direct-current measuring instrument and a plurality of vacuum tubes, each having three electrodes. Means are provided for causing these tubes to be conducting during alternate half cycles and for adjusting the interval during which they are conducting. I also provide a conducting member, in parallel with the vacuum tubes, that is preferably conducting only during those alternate half cycles in which the tubes are non-conducting. The measuring instrument indicates the average condenser charging current and gives, therefore, a measure of maximum voltage.

Fig. 1 of the accompanying drawings is a diagrammatic view of the electrical circuit embodied in my invention.

Fig. 2 is a modification of the diagrammatic view shown in Fig. 1.

Fig. 3 is a diagram representing (a) two cycles of an alternating voltage having more than one maximum per half cycle, and (b) the corresponding current when the voltage is impressed on a circuit similar to the circuit shown in Figs. 1 and 2.

Referring to Fig. 1, a source of voltage to be measured, such as the winding 2 of a transformer, is connected in series relation with a condenser 3, a direct-current measuring instrument 4 and two three-electrode vacuum tubes 5 and 6. The tubes 5 and 6 have means for so exciting their grids that they are conducting during alternate half cycles of the applied voltage wave. A resistor 7 is connected in parallel relation with the tubes and the measuring instrument 4.

It will be observed from (a), Fig. 3, that the current has a zero value for each maximum and minimum value of voltage, thus, the current has both positive and negative values in each half cycle.

Referring to Fig. 3 (b), it will be observed that, when rectifiers are used, the measuring instrument not only indicates the sum of those parts of the curve marked 1 and 3, but also introduces an error by failing to subtract the part marked 2 and by also including the part marked 4, which is a part of the next half cycle.

The tubes of my present invention conduct only for alternate half cycles, and the arrangement is such that one tube passes a positive current only, and the other tube a negative current. The proper current, therefore, passes through the measuring instrument and the system is not subject to the errors above specified.

With the grids properly excited, the tubes are blocked during the alternate half cycles when not conducting, and the current in these half cycles traverses the parallel path through the resistance 7.

Proper grid excitation requires that the voltages applied to both grids shall be in phase. Means are provided for exciting the grids from two coils 8—8 in slots of the rotor of an induction motor. To have the same phase relations, the two coils 8—8 are either in the same rotor slot, or in slots three hundred and sixty electrical degrees apart. The stator 9 of the induction motor is excited by a split-phase winding that is connected to the source of power 1 which is in synchronism with the voltage to be measured.

To assure correct indications of the measuring instrument requires that the tubes be conducting during proper alternate half cycles of the applied voltage wave, that is, during alternate half cycles running from one peak value of voltage to the next. In Fig. 3 (a) the proper range is from 5 to 6, and not from 7 to 8 or other pairs of points a half cycle apart. In operation, I turn the rotor of the induction motor until a maximum indication is obtained on the direct-current meter 4.

A relatively high resistance is required to keep the current through the parallel path negligible when the tubes are conducting, and, consequently, a high voltage drop obtains across the resistor and the tubes during the alternate half cycles of the applied voltage wave when the tubes are non-conducting. To eliminate the high voltages, I provide the circuit shown in Fig. 2. Instead of the resistor 7, I provide a second pair of three-electrode tubes 11 and 12 that are arranged similar to the first pair and with proper grid excitation to cause them to be conducting only in the alternate half cycles of the applied voltage when the tubes 5 and 6 are non-conducting.

Two coils 10—10 that are disposed in slots of the rotor of an induction motor are provided to insure proper grid excitation. The coils 10—10 are connected one hundred and eighty electrical degrees displaced from the slots in the rotor containing coils 8—8. The coils 10—10 need not be in the same slot provided they are three hundred and sixty electrical degrees apart with respect to the rotor.

To cause the tubes to be conducting during the proper alternate half cycles of the applied voltage the rotor of the induction motor is turned until the direct-current meter indicates a maximum deflection.

I do not limit my inventon to the specific arrangements illustrated, as various modifications may be made without departing from the spirit and scope of the invention as set forth in the appended claims.

I claim:

1. In a device for measuring the maximum value of an alternating voltage, the combination with a current-responsive device, of triode vacuum tubes connected in circuit with the current-responsive device, and means for causing the said tubes to be conducting during alternate half cycles of the applied voltage wave, said means being adjustable to change the interval of time the tubes are conducting.

2. In a device for measuring the maximum value of an alternating voltage, the combination with a condenser and a measuring instrument, of a plurality of triode vacuum tubes and means for causing the tubes to be conducting during alternate half cycles of the applied voltage wave, said means permitting a current proportional to the charging current of said condenser to pass through said measuring instrument.

3. In a device for measuring the maximum value of an alternating voltage, the combination with a condenser and a measuring instrument, of triode vacuum tubes and means for causing them to be conducting during alternate half cycles of the applied voltage wave to permit a current proportional to the charging current of said condenser to pass through said measuring instrument, said means being adjustable to change the interval of time the tubes are conducting.

4. In a device for measuring the maximum value of an alternating voltage, the combination with a condenser and a measuring instrument, of triode vacuum tubes, means for causing the tubes to be conducting during alternate half cycles of the applied voltage wave to permit a current proportional to the average charging current of the condenser to traverse the measuring instrument, and means connected in parallel relation with said measuring instrument and the vacuum tubes for conducting current during the half cycles of the applied voltage wave when the tubes are non-conducting.

5. In a device for measuring the maximum value of an alternating voltage, the combination with a condenser and a measuring instrument, of triode vacuum tubes, means for causing the said tubes to be conducting during alternate half cycles of the applied voltage wave to permit a current proportional to the average charging current of the condenser to traverse the measuring instrument, said means being adjustable to change the interval the tubes are conducting, and means connected in parallel relation with said measuring instrument and vacuum tubes for conducting current during the half cycles when the tubes are non-conducting.

6. In a device for measuring the maximum value of an alternating voltage, the combination with a condenser and a measuring instrument, of triode vacuum tubes, and means for causing the tubes to be conducting during alternate half cycles of the applied voltage wave to permit a current proportional to the average charging current of said condenser to traverse the measuring instrument, and other triode vacuum tubes, connected in parallel relation with said measuring instrument and the first mentioned vacuum tubes, having means for causing the second mentioned tubes to be conducting only during the alternate half cycles when the first mentioned tubes are non-conducting.

7. In a device for measuring the maximum value of an alternating voltage, the combination with a condenser and a measuring instrument, of triode vacuum tubes, means for causing the tubes to be conducting during alternate half cycles of the applied voltage wave to permit a current proportional to the average charging current of the condenser to traverse the measuring instrument, and adjustable to means for changing the interval of time the tubes are conducting, triode vacuum tubes connected in parallel relation with said measuring instrument and said first mentioned vacuum tubes, and means for causing the second mentioned tubes to be conducting only during the alternate half cycles when the first mentioned tubes are non-conducting.

8. In a system for measuring the maximum value of an applied voltage, the combination with a current-responsive device, of triode valves for controlling the connection of the current-responsive device to the source of voltage to be measured, a multiphase primary winding excited from a source of energy that is in synchronism with the voltage to be measured, associated secondary windings relatively movable with respect to the primary windings and operatively connected to the grids of the triodes.

9. In a device for measuring the maximum value of an alternating voltage, the combination with a current-responsive device, of triode valves for controlling the circuit of the responsive device and means for causing the valves to be simultaneously conducting during alternate half cycles of the applied voltage wave.

10. In a measuring device, the combination with a condenser upon which is impressed the voltage to be measured and a current-responsive device connected in series with the condenser, of triode valves connected in series with the current-responsive device and means for causing the valves to be simultaineously conducting during alternate half cycles of the applied-voltage wave.

In testimony whereof, I have hereunto subscribed my name this fourth day of December, 1924.

JOSEPH SLEPIAN.